Figure 3:
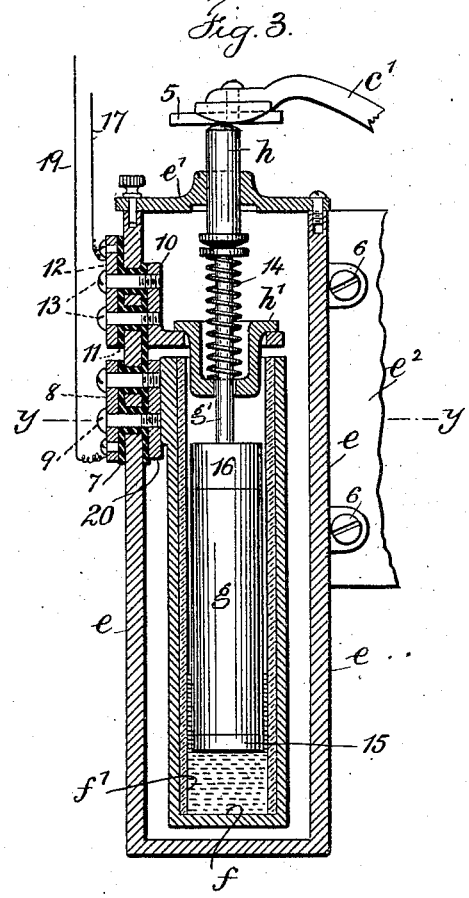

No. 787,722. PATENTED APR. 18, 1905.
O. C. BRITSCH.
MOTOR CONTROLLING AND REGULATING DEVICE.
APPLICATION FILED AUG. 31, 1903.
2 SHEETS—SHEET 1.
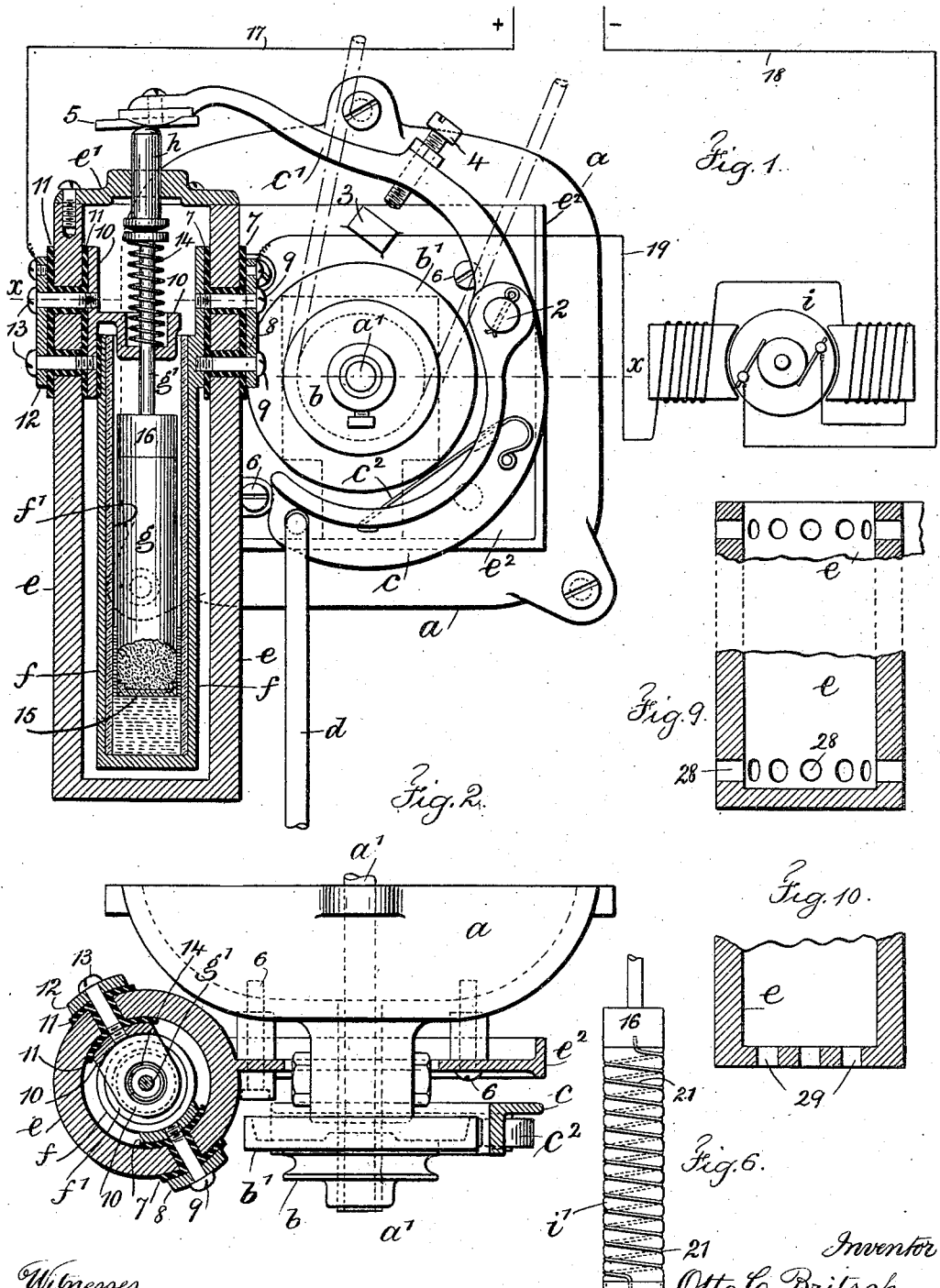
Witnesses
Chas H. Smith
J. Staib
Inventor
Otto C. Britsch
Harold Serrell
atty No. 787,722. PATENTED APR. 18, 1905.
O. C. BRITSCH.
MOTOR CONTROLLING AND REGULATING DEVICE.
APPLICATION FILED AUG. 31, 1903.

2 SHEETS—SHEET 2.

Witnesses
Chas H Smith
J. Staib

Inventor
Otto C. Britsch
per Harold Serrell
atty

No. 787,722. Patented April 18, 1905.

UNITED STATES PATENT OFFICE.

OTTO C. BRITSCH, OF NEW YORK, N. Y., ASSIGNOR TO DAVID WALD, OF NEW YORK, N. Y.

MOTOR CONTROLLING AND REGULATING DEVICE.

SPECIFICATION forming part of Letters Patent No. 787,722, dated April 18, 1905.

Application filed August 31, 1903. Serial No. 171,343.

*To all whom it may concern:*

Be it known that I, OTTO C. BRITSCH, a citizen of the United States of America, residing in the borough of Manhattan, city, county, and State of New York, have invented a new and useful Improvement in Motor Controlling and Regulating Devices, of which the following is a specification.

My invention is designed as an improvement on the device shown and described in Letters Patent granted May 19, 1903, No. 728,537, the objects of my present invention being to simplify the construction, to reduce the cost and weight, and to make more efficient the operation of the device.

My invention relates to an electrical device actuated mechanically for starting, for regulating or controlling the speed of the electric motor, and for stopping the same, especially such motors as are employed for driving various forms of light machinery—such as machines for sewing, embroidering, pinking, and thread-spooling—and in which the electrical device and juxtaposed motor are supported adjacent to the machine to be driven and to a treadle moved by power, preferably the foot of the operator.

In carrying out my invention and upon the establishment of the electric circuit the maximum resistance is in evidence to reduce the power of the current, so as to start the motor slowly, and thereafter and progressively the resistance is progressively reduced, so as to gradually increase the electric current and augment the speed and power of the machine to the maximum and simultaneously with the decrease of the resistance to the minimum. This is a step-by-step action in increasing or decreasing ratio maintained so long as the power of the foot is applied by the operator to the treadle. When the treadle device is released, the power is cut off and a brake is applied to stop the motor, and I prefer to so construct the brake device that the action thereof is not entirely released until appreciably after the current is turned on and the machine started.

In my present improvement a spring-controlled plunger is actuated by the treadle device and moves down into a cylindrical vessel, which it loosely fits and which contains mercury. The plunger displaces the mercury, causing it to rise in the cylindrical vessel and in so doing establish the electric circuit and with said rise to progressively lessen or reduce the resistance in the electric circuit, so as thereby to decrease the resistance and increase the electric current and augment the speed and power of the machine. There are various ways for the performance of this operation and which are generically embraced in my invention and are hereinafter more particularly described.

Figure 4:
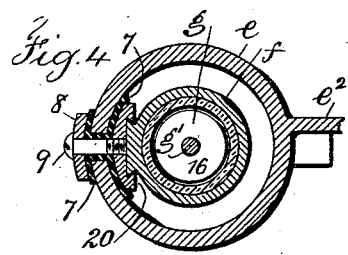
Figure 5:
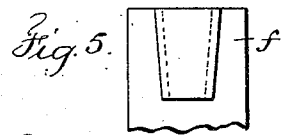
Figure 7:
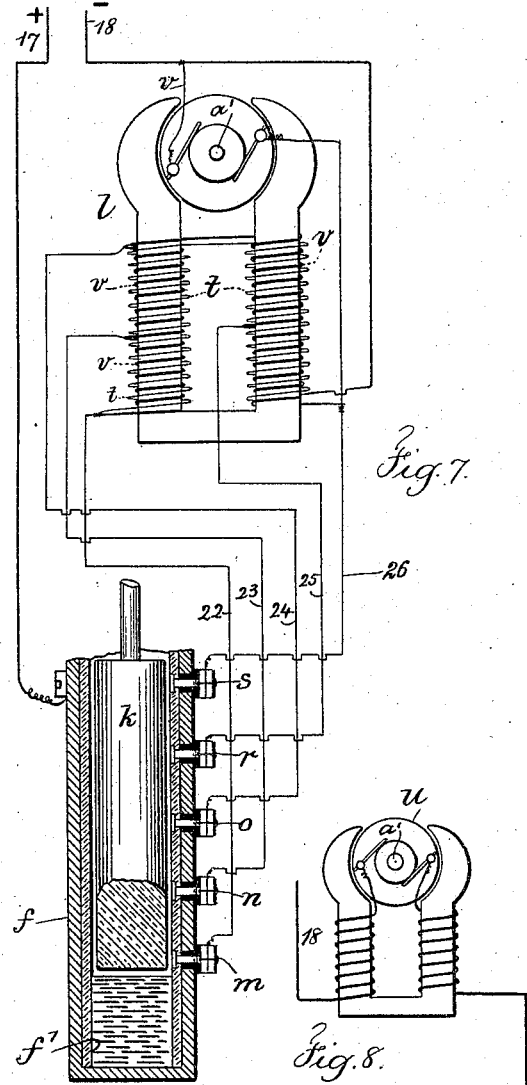
Figure 8:
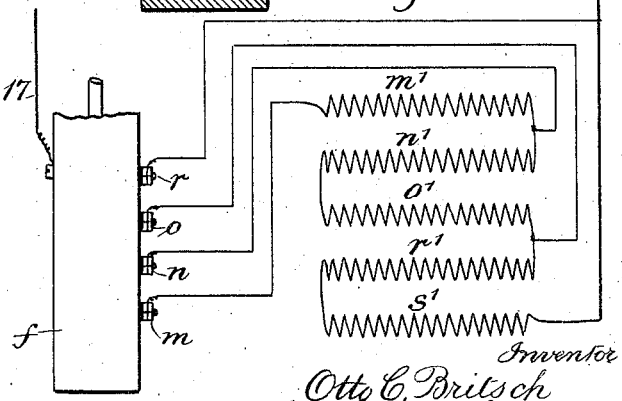

In the drawings, Figure 1 is an elevation and partial section representing my improvement. Fig. 2 is a sectional plan of the parts, Fig. 1, at the line $x\,x$. Fig. 3 is a vertical section of parts similar to parts in Fig. 1, containing, however, a modified arrangement. Fig. 4 is a sectional plan at $y\,y$ of Fig. 3. Fig. 5 is a detached elevation of parts shown in Figs. 3 and 4. Fig. 6 is an elevation of a modified form of plunger. Fig. 7 is a partial vertical and diagrammatic view illustrating a modified form of my invention. Fig. 8 is a diagrammatic view illustrating still another form of my invention. Fig. 9 is a broken vertical section of the case receiving the plunger and its cylindrical envelop, showing a means of cooling or ventilating the same; and Fig. 10 is a vertical section at the lower end of the same case of a modified form of the ventilating-apertures.

$a$ represents one end part of a motor-case; $a'$, a motor-shaft. $b$ represents a pulley secured on said shaft and adapted to receive a belt or cord passing to the driven machine, such as a sewing-machine, to be operated.

$b'$ is a brake-wheel secured on the motor-shaft.

A cylindrical closure $e$, provided with a cover $e'$, is secured to or formed integral with a plate $e^2$, said parts being connected by screws 6 to the case $a$, and a flanged brake-shoe $c$, having an arm $c'$, is pivotally mounted upon the plate $e^2$ at the stud or pivot 2. This flanged brake-shoe is provided with a brake-spring $c^2$, one end of which passes through an aperture in the brake-shoe and is secured thereto, and the other end of which passes freely through a slot in the brake-shoe, with the adjacent end free from connection with the brake-shoe. A treadle-rod $d$ is at its upper end passed through an aperture in the free end of the brake-shoe, and it is preferable to employ with the rod $d$ a foot-treadle. (Not shown in the drawings because of well-known construction.) The plate $e^2$ is made with a lug 3 and the brake-arm $c'$ with a screw 4, which may be turned to adjust the movement imparted by the treadle-rod $d$ to the brake shoe and arm as the contact of the point of the screw and the surface of the lug stops the movement of said parts. The free end of the brake-arm $c'$ is provided with a disk 5. Within the cylindrical closure $e$ is a cylindrical vessel $f$ of metal, and this vessel $f$ has a bottomless glass or insulating lining $f'$. The closure $e$ is made with pairs of apertures, which are filled, and the adjacent surfaces of which closure are surfaced with insulating material 7 11. There are plates 8 and 12 on the outer surfaces of these insulating-bodies 7 11. Screws 9 pass through the plate 8, through the insulating-body 7 and the apertures of the closure $e$, and into the upper flanged end of the cylindrical vessel $f$.

10 is a bracket comprising a plate and a cup-guide. The cup is within the closure $e$ against the insulating-body 11, and it is secured in position by screws 13, which pass through the plate 12, through the insulating-body 11 and apertures of the closure $e$ into the plate portion of the bracket 10, while the cup portion of the bracket 10 passes appreciably down into the lining $f'$ of the cylindrical vessel $f$. The plate portion of the bracket 10 and the upper end of the cylindrical vessel $f$ are insulated from one another.

Within the vessel $f$ and its lining there is a plunger $g$, having a plunger-rod $g'$ rising therefrom and passing through a central aperture of the cup portion of the bracket 10, with a head on its upper end, and a spring 14 surrounds the plunger-rod $g'$ between the head portion and the base of the cup. An auxiliary plunger $h$ passes through a central aperture in the cover $e'$. Its lower enlarged and insulated end bears upon the head of the plunger-rod, and the disk 5 of the brake-arm $c'$ bears upon the upper end of this auxiliary plunger. The plunger $g$ in Figs. 1, 2, 3, and 4 is preferably of high-resistance carbon or other similar material, on the lower end of which is a cap of glass or porcelain 15 as a non-conductor, while on the upper end of said plunger is a metal head 16, connected to the plunger-rod $g'$ and into which the carbon plunger is secured.

The motors $i$, $l$, and $u$ are shown diagrammatically and illustrate the motor, of which $a'$ is the shaft.

Referring particularly to Fig. 1, 17 is a circuit-wire extending from the cup-bracket 10 and the plate 12 to the source of electric energy, while 18 is a wire, also from the source of the power or energy to one commutator of the motor, 19 being the other circuit from the motor to the plate 8, screws 9, and cylindrical vessel $f$, which vessel is filled to about the line shown in Fig. 1 with mercury.

The closure $e$ may be partially filled with a cooling medium, such as oil or turpentine, or, as shown in Fig. 9, the respective ends thereof may be perforated, providing passage-ways 28 for currents of air, or, as shown in Fig. 10, with passage-ways 29, directly in the bottom of the closure for currents of air.

In Fig. 3 I have shown the removable cup-guide $h'$ as a separate part from the bracket 10 and as setting in an aperture in the bracket 10 which is of slightly larger diameter than that of the lining $f'$ of the vessel $f$. This when the cover $e'$ is removed makes it possible to readily lift out of the closure the plunger $g$ and its stem $g'$, which in the structure Fig. 3 brings the cup away with it, whereas in the structure Fig. 1 to perform this function it becomes necessary to remove the screws 13.

Figs. 1 and 3 show the plunger as slightly depressed by the action of the treadle-rod $d$ upon the brake-shoe $c$ and arm $c'$ and with the mercury filling in contact with the carbon-plunger, whereas the initial position of the plunger is higher and that of the mercury filling lower than the cap 15. (See Fig. 7.) In Figs. 3, 4, and 5 the cylindrical vessel $f$ is separated from its supports—that is to say, there is an inside plate 20, with a tapering recess, the opposite edges of which are dovetailed, and the upper end of the vessel $f$ is made with a tapering projection to set into this recess. By this construction after the removal of the plunger the vessel $f$ may be removed without disturbing the connection of its support to the closure $e$.

The operation of the structure as hereinbefore described is as follows: Starting with the initial position of the parts, the first movement of the treadle $d$, swinging the brake-shoe $c$ and its arm $c'$, is to bring the cap 15 into contact with the mercury filling of the cylindrical vessel. With the further downward movement of the plunger the mercury rises above the circumferential union of this cap 15 and the carbon plunger $g$. The circuit is then established from the source of electrical energy through the wire 17, plate 12, screws 13, bracket 10, plunger-rod $g'$, plunger $g$, mercury filling, the cylindrical vessel $f$ at the exposed bottom thereof, from the cylindrical vessel by the screws 9, plate 8, wire 19, motor $i$, and wire 18 back to the source of energy. The carbon plunger $g$ forms a resistance which, with its initial downward movement, is at its maximum with the first contact of the mercury with the lower end thereof. This forms a maximum resistance in starting the motor, adapted to start the same slowly. This slow movement is also measurably assisted, because the spring $c^2$ of the brake-shoe is still in contact with the brake-wheel $b'$ upon the motor-shaft. After the plunger is brought farther down into the cylindrical vessel the mercury is forced higher up on the carbon plunger, thus reducing the resistance, increasing the current, the speed of the motor, and consequently the speed of the machine driven. The parts are so proportioned that with the full downward movement of the plunger $g$ the mercury is forced to rise to contact with the metal head 16, at which time there will be no resistance in the circuit, and the motor will run at its full speed, operating the machine driven at its full capacity.

It is apparent that the current, and consequently the speed, is controlled at the will of the operator by simply varying the pressure upon the foot-treadle, and consequently the position of the brake-shoe $c$ and its arm $c'$, because with the raising of the arm $c'$ the spring 14 acts instantly to elevate the plunger $g$, and the parts work in substantial unison. A similar result is obtained by the construction of plunger in Fig. 6, in which a plunger $i''$, of glass or porcelain, is formed with a spiral groove receiving a wire winding 21 between the head 16 and a ring of metal on the lower end. It is apparent that this spirally-placed wire has a resistance substantially equivalent to that of the carbon plunger $g$ and that as such plunger is forced downward and the mercury rises there is less resistance in the circuit.

Referring now to Fig. 7, the plunger $k$, similarly operated to the plunger hereinbefore described, is to be of porcelain, glass, or other insulating or refractory material, and the motor $l$, diagrammatically shown, is of the compound-wound type. The cylindrical vessel $f$ and its glass or insulating material lining $f'$ are provided with circuit-studs $m$, $n$, $o$, $r$, and $s$ in an ascending group or series. From these studs there are circuit-wires 22, 23, 24, 25, and 26, the wire 22 passing from the lowermost stud $m$, and connections with the field-coils $t$ and $v$, $v$ being the series and $t$ the shunt coils of the motor, while the positive lead is represented at 17 and the negative lead at 18. From an examination of Fig. 7 it will be noticed that the circuit-wire 23 from the stud $n$ extends to connection with the series circuit of the motor-field at a point distant from the connection thereto of the wire 22 and that the circuit-wires 24 and 25 extend to other and separated points of the series circuit $v$ of the motor-field, while the circuit-wire 26 extends from the circuit-stud $s$ directly to the motor-armature and has connected with it the end of the shunt-circuit wire $t$.

In the operation of the structure shown in Fig. 7 the current from the source of supply after the plunger has been depressed and caused the mercury to rise and make electric contact with the lowermost stud $m$ passes by the + lead 17 to the vessel $f$, through the bottom thereof to the mercury and to the stud $m$, thence by the wire 22 to a point of division, where the current is shunted, part passing through the series coils $v$ of the motor-field and through the motor-armature and part passing through the shunt field-coils $t$ to the lead 18, the entire resistance in this circuit being in evidence in starting the motor, thereby imparting to the motor a slow speed and with the maximum torque of the armature. As the plunger $k$ is further depressed and the mercury brought into contact with the stud $n$ the current flowing through the series circuit $v$ of the motor-field travels less than the entire distance of said circuit. Consequently a portion of the same is cut out—that is, the portion from where the circuit-wire 22 enters to where the circuit 23 enters. When the mercury rises and contacts with the stud $o$ and the current is through the wire 24, a further portion of the series circuit is cut out. This is progressively true, for when the mercury contacts with the stud $r$, and similarly when the mercury contacts with the stud $s$, the entire series circuit through the fields is cut out, so that the portion of the current flowing through the armature of the motor is by the circuit-wires $v$ and 26 to the stud $s$. It will thus be seen that as the plunger descends and the mercury rises in the vessel portions of the series circuit will be gradually and progressively cut out, thus lessening the resistance, increasing the current, and consequently the speed of the motor, and necessarily the speed of the mechanism driven.

Referring to Fig. 8, $m'$, $n'$, $o'$, $r'$, and $s'$ represent resistances in series, and it will be quite apparent that, electrically considered, the studs of this structure are the substantial equivalents of the structure hereinbefore described, for when the mercury is in contact with the lowest circuit-stud $m$ the current flowing through the fields of the motor will of necessity flow through all of the resistances, and that when the mercury contacts with the stud $n$ and progressively with the studs $o$ and $r$ portions of these resistances will be progressively cut out, thus lessening the resistance, and consequently increasing the speed of the motor, as well as the speed of the machine driven.

I claim as my invention—

1. The combination with a motor, means coacting therewith for driving a mechanism, electric-circuit wires and a manually-operated mechanism, of a plunger device, a vessel and electric conducting fluid therein in which the plunger moves and is brought into action by the operation of the latter mechanism for closing the electric circuit with its initial movement and through a maximum of resistance for starting the motor, and which plunger device progressively moved lessens or cuts out the resistance for gradually increasing the electric current and augmenting the speed and power of the motor.

2. The combination with a motor, means coacting therewith for driving a mechanism, electric-circuit wires and a manually-operated mechanism acting in one direction to establish the electric circuit and in the opposite direction as a brake, of a plunger device, a vessel and electric conducting fluid therein in which the plunger moves and is brought into action by the operation of the latter mechanism for closing the electric circuit with its initial movement and through a maximum of resistance for starting the motor, and which plunger device progressively moved lessens or cuts out resistance for gradually increasing the electric current and augmenting the speed and power of the motor.

3. The combination with a motor, means coacting therewith for driving a mechanism, and electric-circuit wires, of a device comprising a pivotally-mounted brake shoe and arm, a treadle-rod connected to said device for swinging the same on its pivot, a vertically-moving plunger device actuated by the said brake shoe and arm, a cylindrical vessel receiving the plunger and supports therefor, a body of mercury in said cylindrical vessel which with the downward movement of the plunger, progressively moves along the surface thereof, acting as a switch to change the strength of the electric current flowing through the motor, so as to decrease the resistance and increase the current.

4. In a motor controlling and regulating device, the combination with the motor-shaft, a pulley thereon and a band extending to the device to be operated, and a brake-wheel also on said shaft, of a pivotally-mounted device comprising a brake shoe and arm, a brake-spring extending across the inner curved surface of the brake-shoe and adapted to contact with the surface of the brake-wheel, a treadle-rod for moving the same and means for regulating the movement of the brake shoe and arm.

5. In a motor controlling and regulating device, the combination with the motor-shaft, a pulley thereon and a band extending to the device to be operated, and a brake-wheel also on said shaft, of a pivotally-mounted device comprising a brake shoe and arm, a brake-spring extending across the inner curved surface of the brake-shoe and adapted to contact with the surface of the brake-wheel, a treadle-rod for moving the same, means for regulating the movement of the brake shoe and arm and comprising a lug and an adjusting-screw passing through the arm.

6. In a motor controlling and regulating device, the combination with the motor-shaft, a pulley thereon and a band extending to the device to be operated, and a brake device also on said shaft, of a pivotally-mounted device comprising a brake shoe and arm, a brake-spring extending across the inner curved surface of the brake-shoe and adapted to contact with the surface of the brake-wheel, a treadle-rod for moving the same, means for regulating the movement of the brake shoe and arm, and a vertically-moving spring-returned plunger device actuated by said treadle-rod and brake shoe and arm for completing the electric circuit at maximum resistance and with its movement progressively lessening the resistance of the current and augmenting the strength of the motor.

7. In a motor controlling and regulating device, the combination with the motor-shaft, a pulley thereon and a band extending to the device to be operated, and a brake-wheel also on said shaft, of a pivotally-mounted device comprising a brake shoe and arm, a brake-spring extending across the inner curved surface of the brake-shoe and adapted to contact with the surface of the brake-wheel, a treadle-rod for moving the same, means for regulating the movement of the brake shoe and arm, a vertically-movable spring-returned plunger device actuated by the treadle-rod, brake shoe and arm with its movement, a vessel containing mercury and receiving the said plunger device, tubular insulating-lining to said vessel whereby the current is obliged to pass through the mercury to the bottom of the vessel, the contact of said plunger with the mercury establishing the electric circuit and bringing into the same the maximum amount of resistance which is gradually reduced or cut out with the further movement of the plunger into the mercury, so as to increase the current and augment the speed of the motor.

8. In a motor controlling and regulating device, the combination with a cylindrical closure, of a cylindrical vessel within the same and supports therefor from said closure, a bottomless lining of insulating material within said cylindrical vessel, a plunger and plunger-rod received within said cylindrical vessel and its lining, a bracket-support through which the plunger-rod passes, a spring around the plunger-rod between the bracket-support and the support of the cylindrical vessel and means substantially as shown and described for moving the plunger down into the cylindrical vessel against the action of said spring and a body of mercury within said cylindrical vessel with which the said plunger contacts, substantially as set forth.

9. In a motor controlling and regulating device, the combination with a cylindrical closure, of a cylindrical vessel within the same and supports therefor from said closure, a bottomless lining of insulating material within said cylindrical vessel, a plunger and plunger-rod received within said cylindrical vessel and its lining, a bracket-support through which the plunger-rod passes, a spring around the plunger-rod between the bracket-support and the head of the plunger-rod, said plunger comprising a body of carbon forming a resistance in its length and provided on its lower end with an insulating-cap so as to quickly make and break the electric circuit at the line of division between said parts.

10. In a motor controlling and regulating device, the combination with a cylindrical closure, of a cylindrical vessel within the same and supports therefor from said closure, a bottomless lining of insulating material within said cylindrical vessel, a plunger and plunger-rod received within said cylindrical vessel and its lining, a bracket-support through which the plunger-rod passes, a spring around the plunger-rod between the bracket-support and the head of the plunger-rod, means substantially as shown and described for moving the spring-returned plunger down into the cylindrical vessel to contact with a body of mercury contained therein, electrical connections arranged in series and connected to the surface of the said cylindrical vessel, electric-circuit wires connected therewith and electrical resistance devices with which said circuit-wires engage, substantially as set forth.

11. In a motor controlling and regulating device, the combination with a cylindrical closure, of a cylindrical vessel within the same and supports therefor from said closure, a bottomless lining of insulating material within said cylindrical vessel, a plunger and plunger-rod received within said cylindrical vessel and its lining, a bracket-support through which the plunger-rod passes, a spring around the plunger-rod between the bracket-support and the head of the plunger-rod, a removable cup-guide through which the plunger-rod passes and which is received in an aperture in said bracket-support and against the inner surface of which said spring bears so that the plunger and plunger-rod are readily removable from the cylindrical closure and electric-circuit wires extending from the said bracket-support and cylindrical vessel.

12. In a motor controlling and regulating device, the combination with the motor-shaft, a pulley thereon and a band extending to the device to be operated, and a brake-wheel also on said shaft, of a pivotally-mounted device comprising a brake shoe and arm, a treadle-rod for moving the same, means for regulating the movement of the brake shoe and arm and comprising a lug and an adjusting-screw passing through the arm.

13. In a motor controlling and regulating device, the combination with the motor-shaft, a pulley thereon and a band extending to the device to be operated, and a brake device also on said shaft, of a pivotally-mounted device comprising a brake shoe and arm, a treadle-rod for moving the same, means for regulating the movement of the brake shoe and arm, and a vertically-moving spring-returned plunger device actuated by said treadle-rod and brake shoe and arm for completing the electric circuit at maximum resistance and with its movement progressively lessening the resistance of the current and augmenting the strength of the motor.

14. In a motor controlling and regulating device, the combination with the motor-shaft, a pulley thereon and a band extending to the device to be operated, and a brake-wheel also on said shaft, of a pivotally-mounted device comprising a brake shoe and arm, a treadle-rod for moving the same, means for regulating the movement of the brake shoe and arm, a vertically-movable spring-returned plunger device actuated by the treadle-rod, brake shoe and arm with its movement, a vessel containing mercury and receiving the said plunger device, tubular insulating-lining to said vessel whereby the current is obliged to pass through the mercury to the bottom of the vessel, the contact of said plunger with the mercury establishing the electric circuit and bringing into the same the maximum amount of resistance which is gradually reduced or cut out with the further movement of the plunger into the mercury, so as to increase the current and augment the speed of the motor.

Signed by me this 17th day of August, 1903.

OTTO C. BRITSCH.

Witnesses:
GEO. T. PINCKNEY,
A. H. SERRELL.